2,768,164

PHENOXY-ALKYLAMINO-ALKYLPHENO-
THIAZINES

Paul Gailliot, Paris, and Jacques Gaudechon, Thiais, France, assignors to Societe des Usines Chimiques, Rhone-Poulenc, Paris, France, a French body corporate No Drawing. Application March 18, 1953,
Serial No. 343,251

Claims priority, application France March 20, 1952

3 Claims. (Cl. 260—243)

This invention relates to novel derivatives of phenthiazine having valuable therapeutic properties and to a method for their preparation.

The therapeutically active compounds of this invention are bases represented by the general formula:

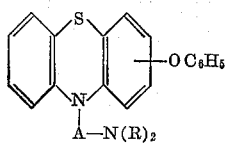

and the salts of such bases, wherein R represents a methyl or ethyl group, A represents a divalent straight or branched aliphatic chain containing 2 or 3 carbon atoms, such as the —(CH2)3— group, and the phenoxy group is attached to one of the positions 1 and 3 of the phenthiazine nucleus (Beilstein nomenclature).

The compounds of the invention may be prepared by a process which comprises condensing the appropriate phenoxyphenthiazine with a tertiary aminoalkyl halide of the formula X—A1—N(R)2 wherein R has the meaning given above, X represents a halogen atom, and A1 represents a divalent straight or branched aliphatic chain containing 2 or 3 carbon atoms which may be the same as the chain represented by A in the above general formula or, in the case of a branched chain, an isomeric form thereof.

The reaction is preferably carried out in the presence of an acid binding agent, being preferably a member of the class consisting of alkali metals and their derivatives, e. g. hydroxides, hydrides, amides, alcoholates and metalalkyl or metal-aryl compounds. The preferred acid binding agents are sodamide, metallic sodium, powdered sodium hydroxide or potassium hydroxide, lithium hydride, sodium tertiary butylate, butyl lithium and phenyl lithium.

The reaction is also preferably carried out in an organic non-ionic diluent which is a solvent for at least one of the two reactants and at or in the neighbourhood of the boiling point of the solvent. It is particularly advantageous to use the tertiary aminoalkyl halide in the form of the free base in solution in an organic solvent, for example benzene, toluene or xylene and to add the solution to a heated (preferably boiling) mixture of the phenthiazine compound, an acid-binding agent and said organic solvent.

The reaction can also be carried out without acid-binding agent by introducing the solution of tertiary aminoalkyl halide, a little at a time, into molten phenthiazine compound. When following either procedure it is necessary in order to avoid loss of organic diluent that the reaction vessel be an autoclave or be fitted with a reflux condenser.

The tertiary aminoalkyl halide can be employed in the form of an acid salt but, in this case, it is obviously necessary to add a greater proportion of acid-binding agent in order to neutralise the acid liberated from the acid salt.

When the halogen and nitrogen atoms of a dimethyl- or diethyl-amino halogenopropane are substituted on adjacent carbon atoms, as for example in the case of 1-dimethylamino-2-chloropropane, the expected product having the following chain:

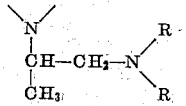

is not exclusively obtained but instead there is formed a mixture of this product and its isomer having the chain:

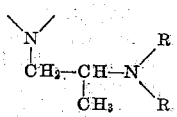

These can be separated by means of their hydrochlorides.

The phenoxyphenthiazines employed as starting material in the above-mentioned process are prepared by the cyclisation of meta-phenoxydiphenylamine with sulphur, desirably in the presence of iodine as catalyst. The cyclisation leads to a mixture of isomers which can be separated by the application of conventional techniques. Starting from meta - monophenoxydiphenylamine:

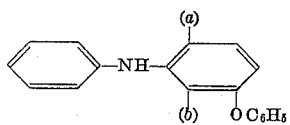

cyclisation takes place not only at (a) giving:

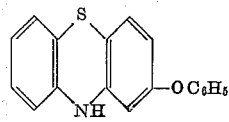

but also at (b) giving:

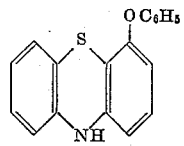

namely a mixture of 1- and 3-phenoxyphenthiazine which can be separated e. g. by fractional crystallisation from a suitable solvent such as a mixture of benzene and cyclohexane.

Such separation is not, however, essential and where it is not effected a mixture of isomeric N-dialkylaminoalkyl phenthiazines is produced following the process of the invention.

The products obtained in accordance with the invention are of value in human or veterinary medicine as anti-histaminics, anti-inflammatory agents, spasmolytics and anti-shock agents.

The following example illustrates the invention. The melting points given are the instantaneous melting points on the Maquenne block.

*Example*

To a boiling suspension of 29.1 g. of phenoxy-phenthiazine (M. P. 153°–154° C.) and 6.5 of sodamide (90%) in 250 cc. of xylene there are gradually added in one hour 90 cc. of a 16% solution in xylene of 3-dimethylamino-1-chloropropane. The mixture is maintained at boiling point for 2 hours following the addition. After cooling, the mixture is taken up in 500 cc. of water and acidified to methyl-orange using 34 cc. of hydrochloric acid (d=1.17). The xylene is separated, the aqueous layer is rendered alkaline to phenolphthalein by the addition of 48 cc. of caustic soda (36° Bé.), in order to liberate the base, and the product is extracted with four separate quantities each of 150 cc. of ether. The combined ethereal extracts are dried over sodium sulphate, the ether is driven off and the product is distilled.

27 g. of 10-(3'-dimethylaminopropyl)-phenoxyphenthiazine are thus obtained, this product distilling at 252° C. under 1.3 mm. pressure. The maleate is prepared therefrom by the action of a maleic acid solution in ethyl acetate on the base dissolved in ethyl acetate. This maleate melts at 115°–116° C.

By operating in the same manner, but starting with a phenoxyphenthiazine having a M. P. of 121°–122° C., the corresponding 10-(3'-dimethylaminopropyl)-phenoxyphenthiazine is obtained, boiling at 245° C. under 0.8 mm. pressure. The oxalate of this phenoxyphenthiazine has a M. P. of 153° C.

From a phenoxyphenthiazine having a M. P. of 153°–154° C., the corresponding 10-(3'-diethylaminopropyl)-phenoxyphenthiazine (the hydrochloride of which has a M. P. of 90°–91° C.) is prepared in similar manner by reaction with 3-diethylamino-1-chloropropane.

We claim:
1. The compound 10 - (3' - dimethylaminopropyl) - 3-phenoxy-phenthiazine B. P. 252° C./1.3 mm. Hg pressure.

2. The compound 10 - (3' - diethylaminopropyl) - 3-phenoxy-phenthiazine, the hydrochloride of which has a melting point of 90–91° C.

3. A therapeutically active compound having the structure of the general formula:

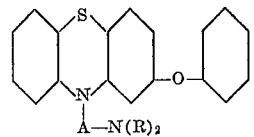

wherein R represents a member of the class consisting of a methyl and an ethyl group and A represents a two to three carbon alkylene group.

References Cited in the file of this patent
UNITED STATES PATENTS

| | | |
|---|---|---|
| 2,123,929 | Bousquet | July 19, 1938 |
| 2,519,886 | Charpentier | Aug. 22, 1950 |

FOREIGN PATENTS

| | | |
|---|---|---|
| 1,057,110 | France | Oct. 28, 1953 |